UNITED STATES PATENT OFFICE.

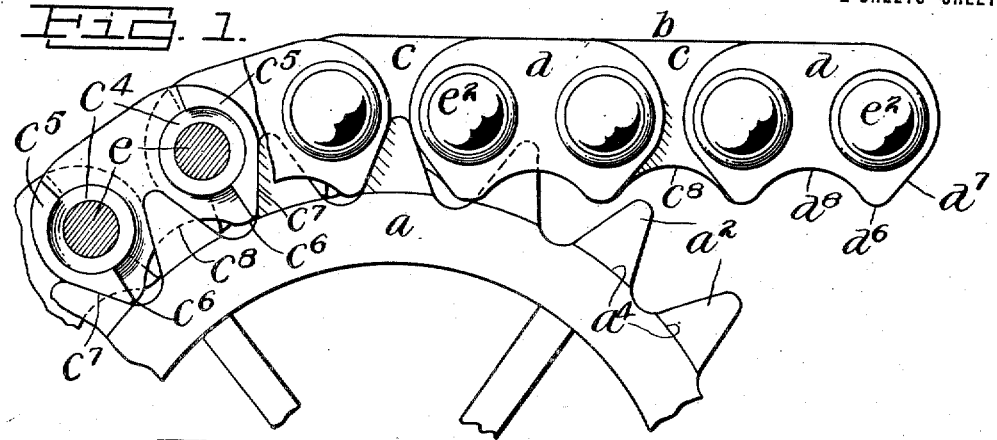
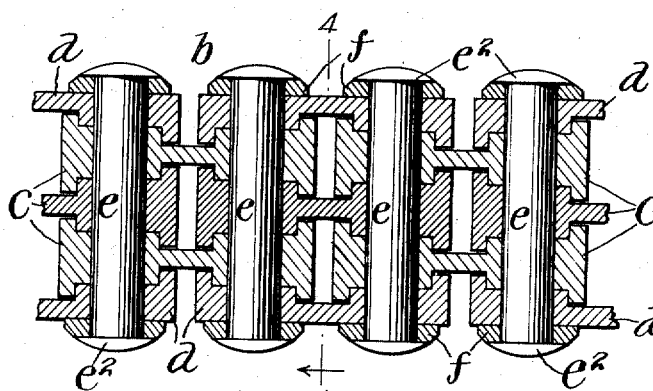
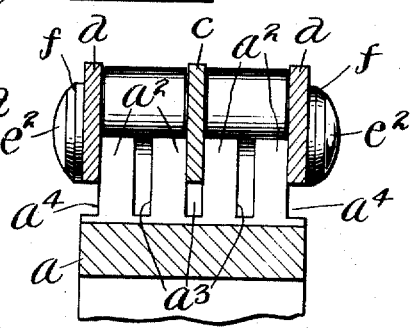
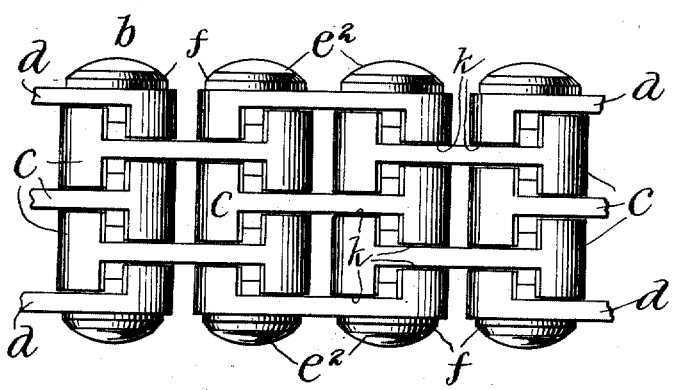

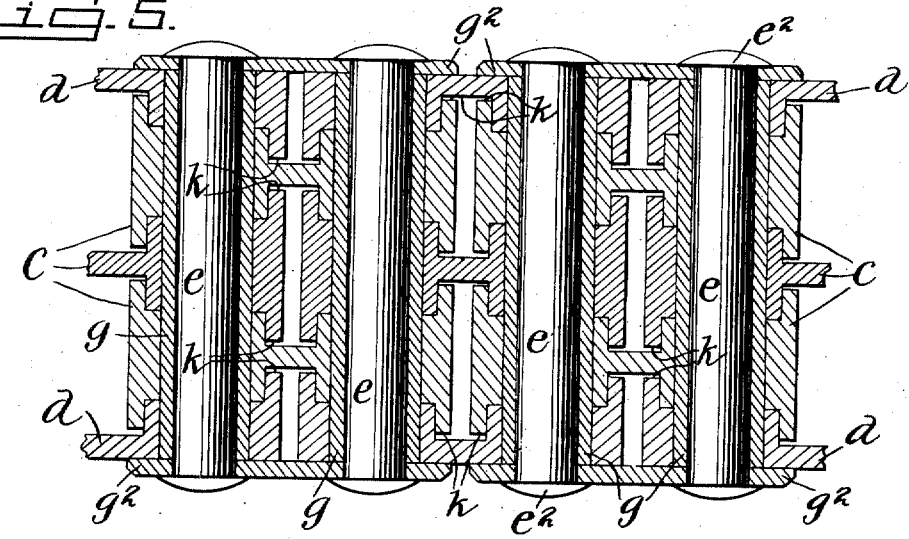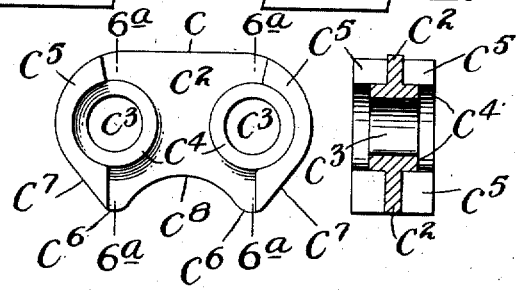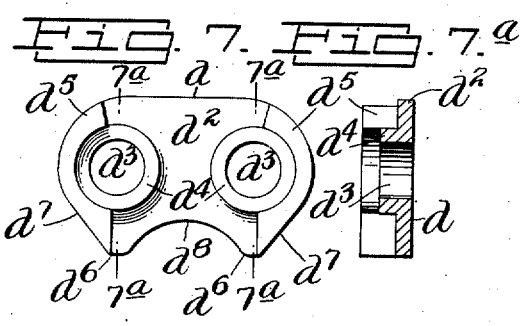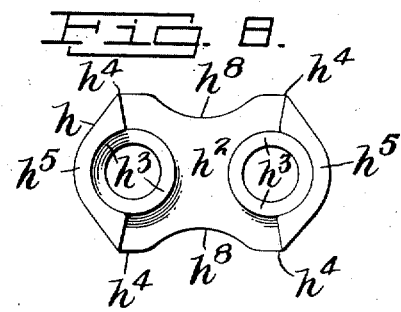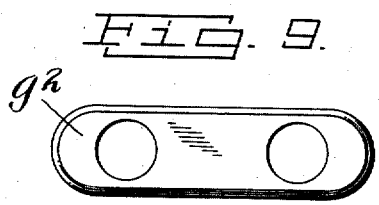

HEBRON B. LAYMAN, OF NEW YORK, N. Y., ASSIGNOR OF ONE-FOURTH TO F. E. LONAS, OF NEW YORK, N. Y.

DRIVE CHAIN AND GEAR.

1,259,027.   Specification of Letters Patent.   Patented Mar. 12, 1918.

Application filed July 22, 1913, Serial No. 780,420. Renewed May 8, 1916. Serial No. 96,253.

*To all whom it may concern:*

Be it known that I, HEBRON B. LAYMAN, a citizen of the United States, and residing at Manhattan, in the county of New York and State of New York, have invented certain new and useful Improvements in Drive Chains and Gears, of which the following is a specification, such as will enable those skilled in the art to which it appertains to make and use the same.

This invention relates to chains, especially multiple strand chains and particularly driving chains, and more particularly, but not solely, to "silent" or angular-toothed chains.

An object of this invention is to increase the effective bearing area of the links comprising the chain; another object is to increase the contact of the links with the gear; another is to provide a drive chain in which great strength is secured in proportion to its width and weight. Other objects will appear hereafter in the specification and in the claims, discernible to those skilled in the art.

The invention is fully disclosed in the following specification, of which the accompanying drawings form a part, in which the separate parts of my invention are designated by suitable reference characters in each of the views, and in which:—

Figure 1 is a side view of a part of a gear or sprocket wheel, having a piece of my improved drive chain mounted thereon, and part of which is in section;—

Fig. 2 a horizontal sectional view of a part of the drive chain extended;—

Fig. 3 a plan view of the part of the drive chain shown in Fig. 2;

Fig. 4 a transverse section on the line 4—4 of Fig. 2;—

Fig. 5 a view similar to Fig. 2, but showing a modification.

Fig. 6 a side view of one of the central or intermediate links of my improved drive chain;—

Fig. 6$^a$ a cross sectional view on either of the lines 6$^a$—6$^a$ of Fig. 6;—

Fig. 7 an inner side view of one of the side links of my improved chain;—

Fig. 7$^a$ a section on either of the lines 7$^a$—7$^a$ of Fig. 7;—

Fig. 8 a view similar to Figs. 6 and 7 but showing a modified form of link used in a chain designed to gear on both sides of the pitch line;

Fig. 9 a side view of a side plate shown in Fig. 5.

In the accompanying drawing $a$ is a part of the rim of a gear or sprocket wheel that may be used with my new chain. Its sprockets or teeth $a^2$ are cut to form circumferential recesses $a^3$ to receive the central web portions of the intermediate links of the chain. The ends of said teeth being also provided with recesses $a^4$, to receive the central web or body portions of the side links.

The chain $b$ is composed of side links $d$, and central links $c$ having a body or web portion $c^2$ apertured with pin holes $c^3$ provided with hubs $c^4$ which project at the opposite sides of the web or body portion to form annular or concentric pivot bearings, and are also provided on the outer sides with concentric arc-shaped bearings $c^5$ which thicken said links at the ends thereof and increase the strength thereof. The end portions of said links $c$ at the bottom thereof and the central arc-shaped bearings $c^5$ are extended downwardly to form sprockets $c^6$ having bearing surfaces $c^7$ which operate on the teeth $a^2$ of the gear $a$, and the arc-shaped bearings $c^5$ on the outer side of the hub or hub flanges $c^4$ are thicker or deeper in transverse section than said hub flanges or bearings $c^4$, as is clearly shown in Fig. 6$^a$. The central web or body portion between the teeth $c^6$ is cut out or removed to form an arc-shaped recess $c^8$.

The side links $d$ are similar to the central links $c$ except that the web or body portion $d^2$ is provided only on one side with a pivot bearing $d^4$ and an arc-shaped bearing $d^5$ around the pin holes $d^3$.

The links are connected to form the chain by tie pins $e$ passed through the pin holes of the central and side links, and said pins are provided at their opposite ends with washers $f$, in the form of construction shown, which bear on the side links and the ends of said pins are riveted, as shown at $e^2$.

When the links are connected as shown in Figs. 2 and 3, the side and central links together have a bearing on the entire surface of the pins, and the pivot bearings $c^4$ are inclosed and borne upon by the arc-shaped bearings $c^5$, and the pivot bearings $d^4$ and the supplemental arc-shaped bearings $d^5$ interlock with the corresponding bearings of the adjacent central links, as is also clearly shown in Fig. 2, and strain upon one transverse set of links is distributed over the adjacent links. Thus the danger of shearing or breaking the tie pins is reduced to a minimum, if not rendered impossible. The parts of the links designated $d^6$, $d^7$ and $d^8$ are similar to parts $c^6$, $c^7$ and $c^8$ of the links $c$ hereinbefore described.

Obviously I may apply my invention to the common form of "silent" chain link, in which the body or the web portion of the link is cut out to straddle the teeth of the gear, but one of the features of the form of link which I have shown in the drawings by way of example, is that as a line drawn between the center of the pin holes $c^3$ and $d^3$ would divide the body or web portion of the link approximately centrally thereof, "springing" of the links and the consequent alteration of the included angle of the link faces is entirely obviated.

The construction shown in Fig. 5 is exactly the same as that shown in Figs. 1 to 4 inclusive except that bushings $g$ are employed on the tie pins $e$ and additional side plates $g^2$ at the sides of the chain.

In Fig. 8 I have shown a link $h$ in all respects similar to link $c$ but toothed on both sides of the pitch line. The central portion $h^2$ of the link $h$ is cut out both at the top and bottom thereof to form an arc-shaped recess $h^3$, and projecting sprockets $h^4$ on both side edges of the link, and in each end portion of the link are concentric bearings $h^3$ and $h^5$, corresponding to the concentric bearings $c^4$ and $c^5$ of the link $c$.

I also provide spaces $k$ between the side faces of the arc-shaped bearing members and body portions of the links, the object of which is to prevent unnecessary friction occasioned by abraded material produced in the operation of the chain, collecting between the said surfaces and the body or web portions of the links, and thus causing the chain to bind or grip.

My invention is not limited to the exact form of the links herein shown and described, or of the form and arrangement of the concentric and arc-shaped flange bearings $c^4$ and $c^5$, and $d^4$ and $d^5$, and changes in and modifications of these features of the construction as herein shown and described, as well as of others, may be made within the scope of the appended claims, without departing from the spirit of my invention or sacrificing its advantages.

In the foregoing description, while I have referred to the reinforcing bearings $c^4$ and $c^5$, and $d^4$ and $d^5$ of the central or intermediate links $c$ and the side links $d$, as annular and concentric, with the pin holes, this need not necessarily be so. While all these concentric members, no matter what position they occupy around the pin holes, operate to reinforce and strengthen the links, their chief object is to provide interlocking link bearings and to increase the bearing surface of the links on the pins or on the bushings $g$ when the construction shown in Fig. 5 is employed, and in addition to this the concentric flange bearings $c^5$, $d^5$ and $h^5$ also serve in connection with the body portions of the links themselves to provide greater bearing surfaces which operate on the teeth of the gear.

In the accompanying drawings the intermediate links $c$ are of I-shape in cross section, while the side links $d$ are half I-shape in cross section.

Obviously I may form the chain entirely of links such as $d$ in the accompanying drawings.

I do not bind myself to any particular manner of making the links; I may form them by die-casting, or by coining, or from sheet metal stampings, or in any other desired manner, and while I have shown the reinforcing bearings $c^4$ and $c^5$ of the intermediate links and $d^4$ and $d^5$ of the side links as made integral with the web or body portion $d^2$, I do not limit myself to this construction, and I may apply either or both these bearings $c^4$ and $c^5$ to the body portion.

In the accompanying drawing I have shown the rivets employed as cylindrical but my invention is not limited to any particular kind, class or form of rivets and any suitable devices of this class may be employed.

Having fully described my invention what I claim as new and desire to secure by Letters Patent, is:—

1. A chain composed of flat links having pin holes in their opposite ends and coupling pins passed through said holes, said links being also provided around said holes with supplemental annular bearings concentric with said pins and bearing thereon and provided outside of said supplemental annular bearings with additional arc-shaped bearings also concentric with said pins, the arc-shaped bearings on one link overlapping the supplemental annular bearings on another link.

2. A chain composed of flat links having pin holes in their opposite ends and coupling pins passed through said holes, said links being also provided around said holes with supplemental annular bearings concentric with said pins and bearing thereon and provided outside of said supplemental annular bearings with additional arc-shaped bearings also concentric with said pins, the arc-shaped bearings on one link overlapping the supplemental annular bearings on another link, said additional arc-shaped bearings being of greater transverse dimensions than the supplemental annular bearings whereby said links and the supplemental annular bearings have a bearing engagement on said pins and whereby the additional arc-shaped bearings of one link overlap and engage the corresponding supplemental annular bearings of other links.

3. A power device comprising a gear and a drive chain mounted thereon and composed of links consisting of flat body portions having pin holes in their opposite ends, and pins passed through said holes, the body portions of said links being provided around said holes and inwardly and outwardly thereof with concentric interlocking flanged bearings, the flanged bearings at the ends of the body portions of the links also forming, in connection with said body portions, gear engaging teeth having extended bearing surfaces on which the teeth of the gear operate.

4. In a chain, a link having a laterally projecting end constituting a gear face, a bearing projecting outwardly beyond the link web, and an arc-shaped bearing adapted to bear upon the bearing of a substantially similar coöperating link.

5. The combination in a chain of two coöperating links having substantially similar adjoining faces and means coupling the two links; each link having a projecting pivot bearing and a projecting arc-shaped bearing, the said arc-shaped bearing of each link being adapted to bear upon the pivot bearing of the other link.

6. The combination in a chain of two coöperating links, both apertured to receive a pivot pin, and having substantially similar adjoining faces and a pivot pin within said apertures coupling the two links; each link having a projecting pivot bearing and a projecting arc-shaped bearing, the said arc-shaped bearing of each link being adapted to bear upon the pivot bearing of the other link.

7. In a chain, a link having in one end and at one side thereof a projecting pivot bearing, and a projecting end constituting a gear face and an arc-shaped bearing.

8. In a chain, a link apertured to receive a pivot pin, and having a protruding convex bearing, and a projecting end constituting an arc-shaped concave bearing.

9. In a chain, a link apertured to receive a pivot pin and having a projecting convex bearing, and a laterally projecting end constituting a gear face and a concave arc-shaped bearing.

10. In a chain, a link having at one side and in one end thereof, a concave and a convex bearing, both adapted to be borne upon by a substantially similar coöperating link.

11. In a chain, a link having a pair of projecting pivot bearings determining the pitch, and at each end of the link a lateral projection constituting an arc-shaped bearing and a gear face.

12. In a chain, a link having a pivot pin aperture in one end, and at one side of the link and concentric with said pivot pin aperture, a concave and a convex bearing, both adapted to bear simultaneously upon a coöperating link when the chain is in tension.

13. In a chain, a link having in one end and at one side thereof, a protruding convex pivot bearing, and concentric therewith an extending concave bearing of equal radius.

14. In a chain, a link having in one end and at one side thereof, a protruding convex pivot bearing, and concentric therewith an extending concave bearing of greater transverse dimension.

15. In a chain, a link having in one end and at one side thereof, a protruding convex bearing, and concentric therewith and of equal radius, a concave bearing.

16. In a chain, a link having in one end and at one side thereof, a protruding convex bearing, and concentric therewith and of equal radius, a concave bearing of greater transverse dimension.

17. In a chain, a link having in one end and at one side thereof, a protruding convex bearing, and concentric therewith and of equal radius, a concave bearing of less than 180° arc length.

18. In a chain, operatively combined, a pair of links which pivot upon each other, with both a concave and a convex arc-shaped bearing on each link.

19. In a chain, operatively combined, a pair of pivoted links, having, when in tension, a load-sustaining bearing upon each other on both sides of the axis of the bearing.

20. In a chain, operatively combined, a pair of links pivoted upon a bearing, and, having, when in tension, a bearing upon each other on both sides of the pivot axis.

21. In a chain, operatively combined, a pair of links having, when in tension, a pivot bearing upon each other of more than 180° of the bearing circumference.

22. In a chain, a link having a pivotal connection in one end and having at one side thereof and disposed at opposite sides of the pivot axis, a protruding convex bearing and a projecting concave bearing of equal radius.

23. In a chain, a link having a pivotal connection in one end and having at one side thereof and disposed at opposite sides of the pivot axis, a protruding convex bearing and a projecting concave bearing of greater transverse dimensions.

24. In a chain, a link having a pivotal connection in one end and having at one side thereof and disposed at opposite sides of the pivot axis, a protruding convex bearing and a projecting concave bearing of equal radius and of less than 180° arc length.

25. In a chain, operatively combined, a pair of links having, when in tension, a pivot bearing upon each other of more than 180° of the bearing circumference, said pivot bearing comprised of an arc-shaped bearing upon each link.

26. In a chain, a link having a pin hole, a bearing projecting outwardly beyond the link web, and an arc-shaped bearing adapted to bear upon the bearing of a substantially similar coöperating link.

27. In a chain, a link having a pin hole, a bearing projecting outwardly beyond the link web, and an arc-shaped bearing of greater radius than said pin hole.

28. In a chain, a link having in one end and at one side thereof, a projection constituting both a gear face and an arc-shaped bearing, the said arc-shaped bearing being of less than 180° arc length.

29. In a driving chain, a link having on one side in one end portion thereof, a lateral projection constituting a gear face, a bearing, and a supplementary arc-shaped bearing concentric with said bearing, both of said bearings projecting outwardly beyond the link web.

30. In a driving chain, a link having in one portion thereof a lateral projection constituting a gear face, a projecting bearing, and an arc-shaped bearing.

31. The combination in a chain, of two coöperating links having substantially similar adjoining faces and means coupling the two links, each link having a projection constituting a gear face and an arc-shaped bearing, and having also a projecting pivot bearing, the said arc-shaped bearing of each link being adapted to bear upon the pivot bearing of the other link.

32. In a chain, operatively combined, a pair of links provided with a pivotal bearing having, when in tension, a load-sustaining bearing surface of more than 180° of the circumference of the bearing.

In testimony that I claim the foregoing as my invention I have signed my name in presence of the subscribing witnesses this 18th day of July, 1913.

HEBRON B. LAYMAN.

Witnesses:
FRANCES B. VANDERBILT,
SOLOMON BUXBAUM.